No. 867,862. PATENTED OCT. 8, 1907.
R. D. WHITE.
APPARATUS FOR INSTRUCTING GUN LAYERS IN POINTING GUNS.
APPLICATION FILED JAN. 21, 1907.
5 SHEETS—SHEET 1.
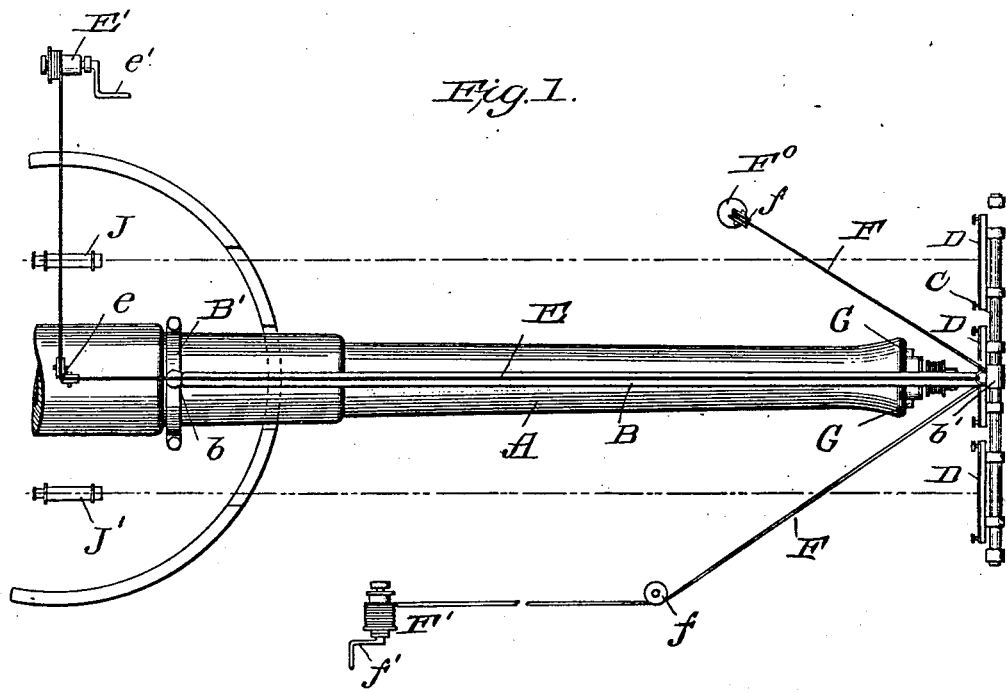
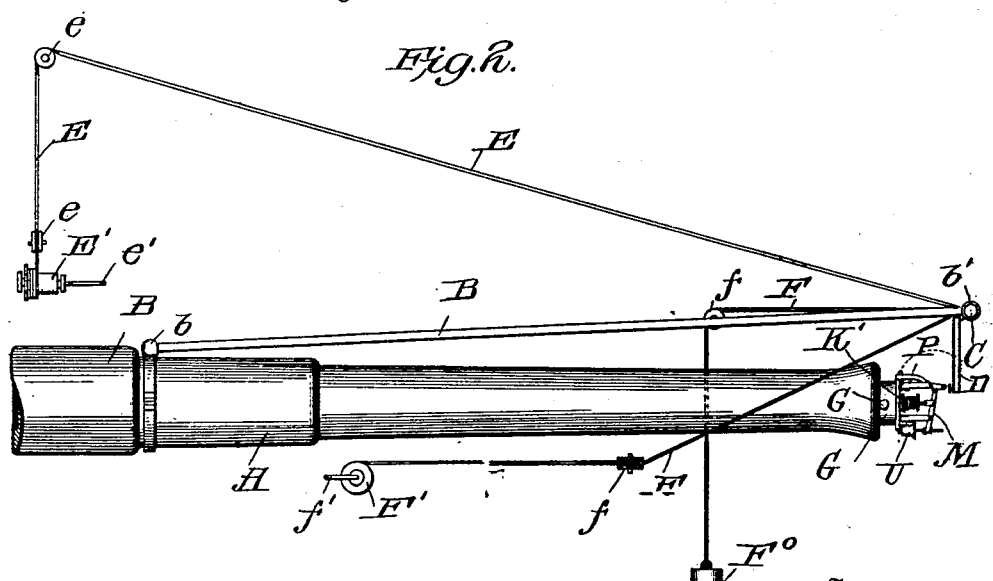

No. 867,862. PATENTED OCT. 8, 1907.
R. D. WHITE.
APPARATUS FOR INSTRUCTING GUN LAYERS IN POINTING GUNS.
APPLICATION FILED JAN. 21, 1907.
5 SHEETS—SHEET 2.
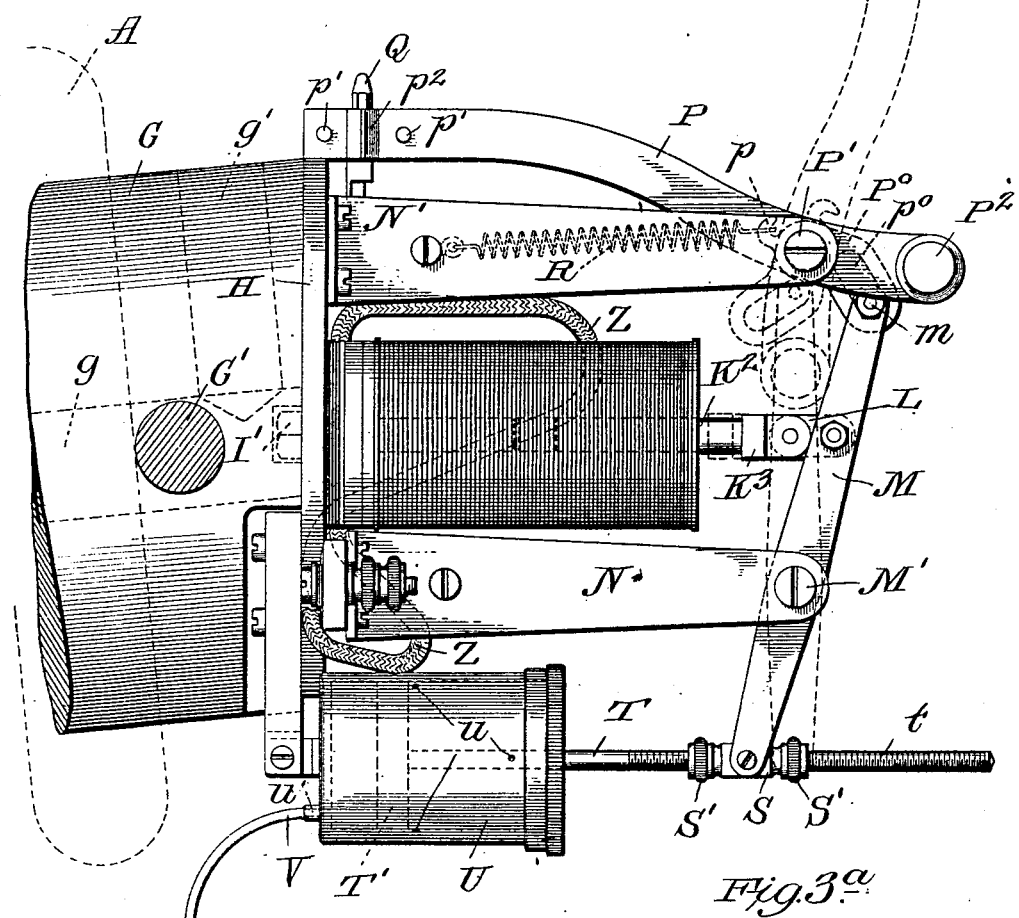

No. 867,862. PATENTED OCT. 8, 1907.
R. D. WHITE.
APPARATUS FOR INSTRUCTING GUN LAYERS IN POINTING GUNS.
APPLICATION FILED JAN. 21, 1907.
5 SHEETS—SHEET 3.
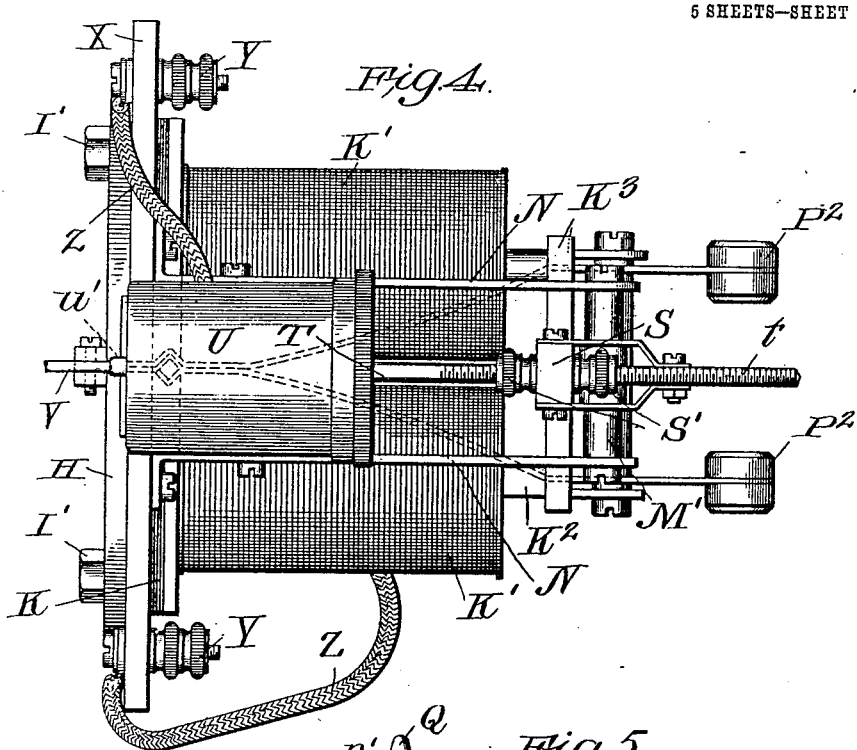
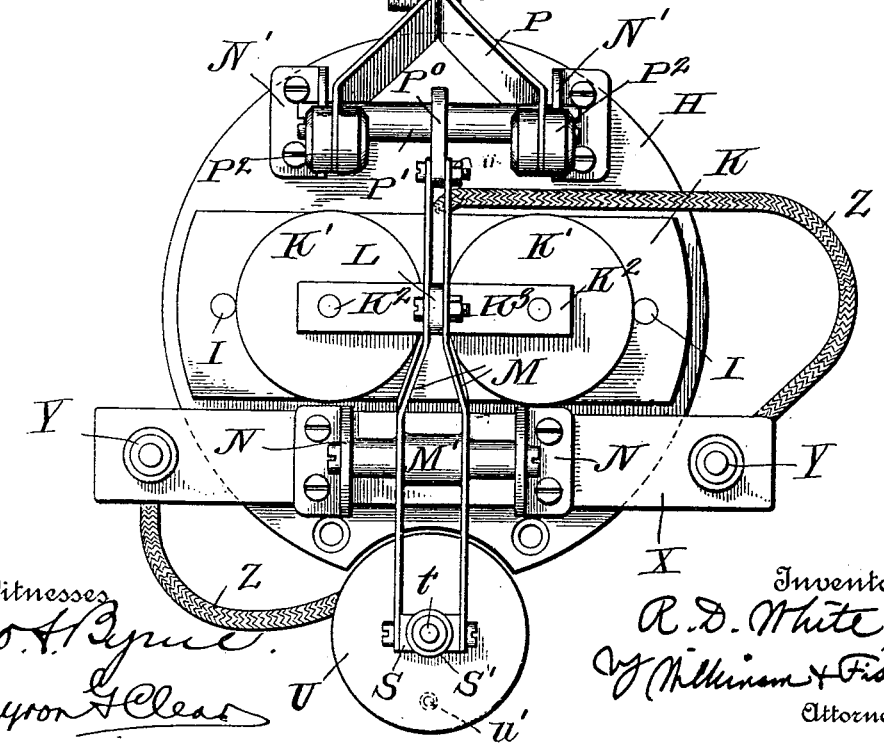

No. 867,862. PATENTED OCT. 8, 1907.
R. D. WHITE.
APPARATUS FOR INSTRUCTING GUN LAYERS IN POINTING GUNS.
APPLICATION FILED JAN. 21, 1907.

5 SHEETS—SHEET 4.

Witnesses
Inventor,
R. D. White,
by Wilkinson & Fisher,
Attorneys

No. 867,862. PATENTED OCT. 8, 1907.
R. D. WHITE.
APPARATUS FOR INSTRUCTING GUN LAYERS IN POINTING GUNS.
APPLICATION FILED JAN. 21, 1907.
5 SHEETS—SHEET 5.
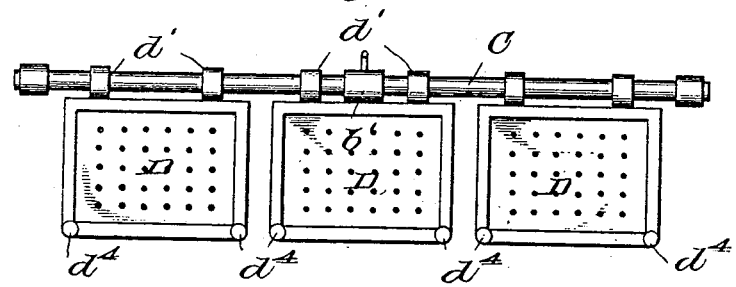
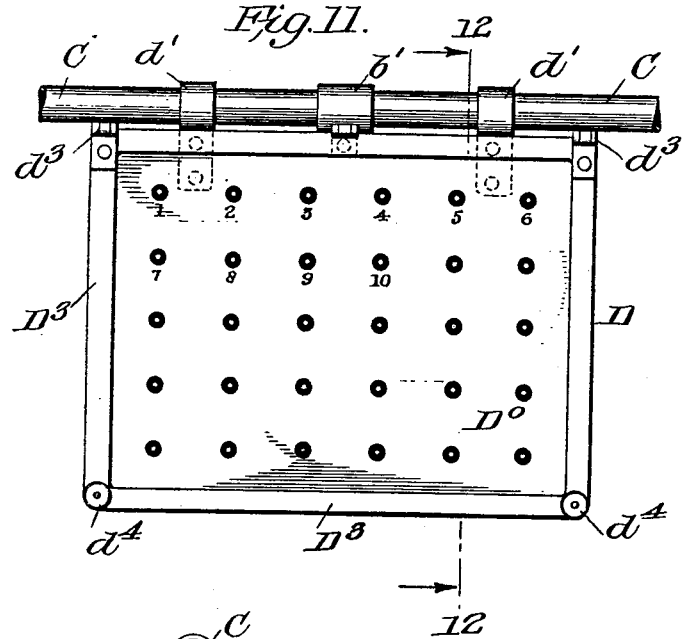
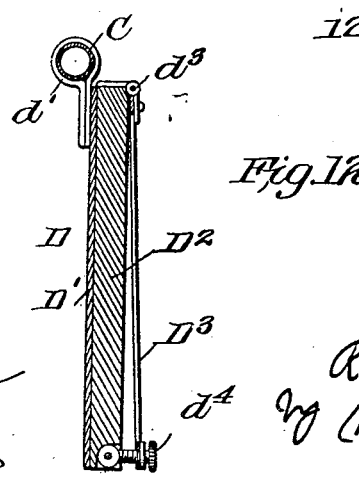

UNITED STATES PATENT OFFICE.

RICHARD D. WHITE, OF WASHINGTON, DISTRICT OF COLUMBIA.

APPARATUS FOR INSTRUCTING GUN-LAYERS IN POINTING GUNS.

No. 867,862.  Specification of Letters Patent.  Patented Oct. 8, 1907.

Application filed January 21, 1907. Serial No. 353,370.

*To all whom it may concern:*

Be it known that I, RICHARD D. WHITE, a citizen of the United States, residing at Washington, in the District of Columbia, have invented certain new and useful Improvements in Apparatus for Instructing Gun-Layers in Pointing Guns; and I do hereby declare the following to be a full, clear, and exact description of the invention, such as will enable others skilled in the art to which it appertains to make and use the same.
This invention relates to improvements in apparatus for training guns' crews, to point guns without actually firing any projectile at the target, but in which one or more targets, which may or may not have independent motion relative to the gun, are caused to illustrate similar results, as if the target had actually been struck by a projectile fired either by the gun or by a sub-caliber device mounted in or near the gun.

My invention will be best understood by reference to the following description when taken in connection with the accompanying illustration showing one specific embodiment thereof, while its scope will be more particularly pointed out in the appended claims.

Figure 6:
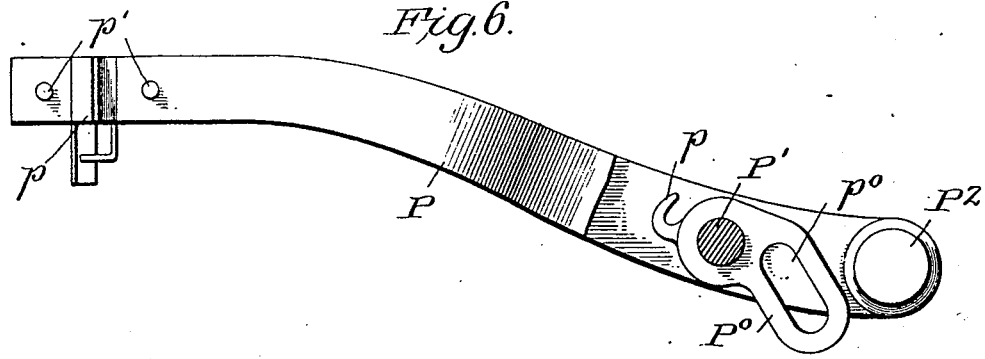
Figure 7:
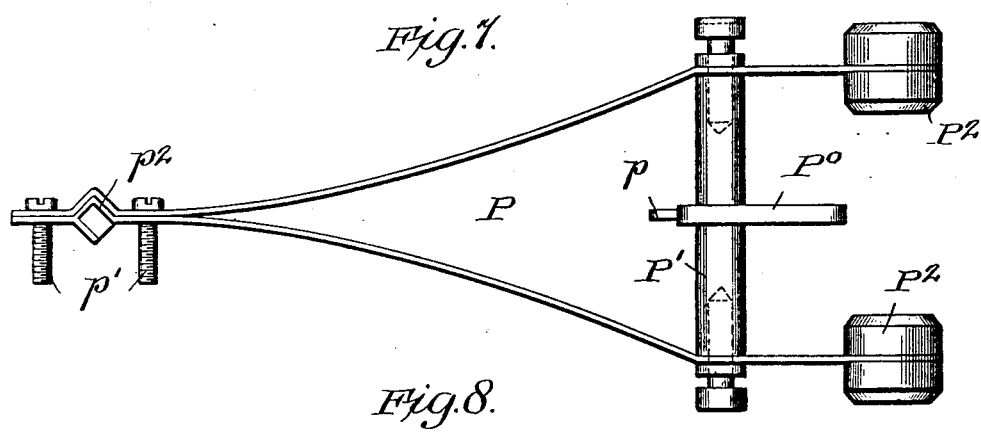
Figure 8:
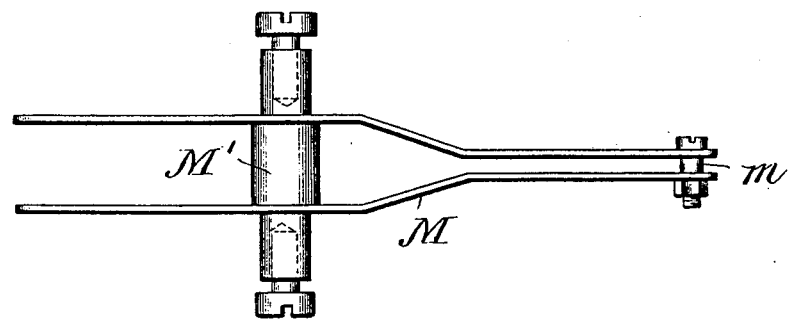
Figure 9:
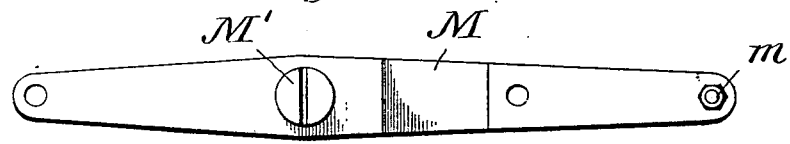

In the drawings:—Figure 1, as illustrative of one form of my invention, shows a plan view partly diagrammatic of a single gun mounted in broadside, parts being omitted, and parts being broken away for the sake of clearness in the drawings; Fig. 2 is a side elevation of the apparatus shown in plan in Fig. 1; Fig. 3 is a side elevation of the tampion mounted in the muzzle of the gun with the apparatus for operating the dotter carried by said tompion; Fig. 3$^a$ is a detail showing the scale for the retarding valve; Fig. 4 is an inverted plan view of the apparatus carried by the front end of the tampion, as seen in Fig. 3; Fig. 5 is an end view of the apparatus shown in Fig. 3, as seen from the right of said figure; Fig. 6 is a detail showing in side elevation the pivoted arm carrying the pencil point or other marker; Fig. 7 is a plan view of the device shown in Fig. 6; Fig. 8 is a detail showing, in front elevation, the rocking frame adapted to be connected to the electromagnet for swinging the dotter arm; Fig. 9 is a side elevation of the device shown in Fig. 8; Fig. 10 shows the cross head attached to the swinging boom and carrying three similar target boards; Fig. 11 shows a front view of one of the targets on a larger scale with the paper sheet on, and Fig. 12 shows a section along the line 12—12— of Fig. 11, and looking in the direction of the arrows, but omitting the paper sheet.

Referring to the drawings and to the embodiment of my invention there shown, I have illustrated my invention as applied to a gun having the body A, such gun being of any suitable or desired construction and mounted in any usual or desired way. It will be understood that not only as to the details hereafter described, but also as to the mode of application of this apparatus to the gun, and the construction or character of the gun or guns to which it may be applied, my invention is in no sense restricted to what is here shown or suggested.

For the purpose of supporting the target or other devices upon which record is to be made, or with reference to which indication of the aim is to be effected, the gun body A carries the clamp ring B' (Figs. 1 and 2) to which the swinging boom B is connected, so that said boom may have universal motion about the socket b. The ordinary ball and socket joint, or suitable gimbals, may be provided for this purpose. This boom carries at its forward end a sleeve b', in which the crosshead C is rigidly secured, and this cross head carries sleeves d' for supporting the targets D.

Although one or any number of targets may be used, there are preferably three of these targets, which are substantially similar in every respect, and are so arranged that the left hand target may be kept in the field of the telescope J, and the right hand target kept in the field of the telescope J', which telescopes are used for training the gun laterally and for taking care of the elevation of the gun respectively, while the central target is, or preferably should be, maintained in a position to be intersected by the vertical plane through the axis of the bore of the gun.

Each target (Figs. 10 and 12) consists of a back plate D', to which a wooden board D$^2$ is secured, and in front of each of these is a frame D$^3$, which is hinged to said board, as at d$^3$, see Fig. 12, while the opposite end of the frame D$^3$, may be clamped to said board by the clamp screws and nuts d$^4$. Any means to receive the record may be employed, but herein paper sheets D$^0$ bearing representations of bull's eyes, 1 to 10 etc., is stretched over the board D$^2$ and is clamped down beneath the frame D$^3$ by means of the clamp screws and nuts d$^4$, and thus the paper sheet D$^0$ is held firmly in place, as shown in Fig. 11.

In order to give the gun's crew practice in firing at a moving target from a moving platform, means are provided for moving the target either vertically or laterally, which means are preferably made independent of each other, so that all the conditions as to relative speeds of a vessel firing and a vessel aimed at, and the rolling or pitching of the firing vessel, may be represented in actual practice with the apparatus.

In the illustrated apparatus vertical movement (Figs. 1 and 2) is imparted to the various targets by moving the boom B through a vertical angle, which is effected by hauling up or easing down on the wire rope E, which passes over suitable pulleys e and is connected to the drum E', which may be turned by the handle e'. Lateral movement to the targets is imparted by means of the wire rope F, which carries at one end the weight F$^0$, and is connected at the other end to the drum F', which may be turned by the hand crank f'. This rope F passes over suitable pulleys f, and by winding up or easing off on the drum F', the targets may be swung through an angle laterally. By having the vertical motion independent of the horizontal motion, practice may be had for correcting for the various differences of speed of the vessel firing and the vessel aimed at, and for different rates of roll or pitch of the gun platform, and these two motions may be compounded to compare with all sorts of possible conditions in practice.

The target being held in front of the gun, as described, the relative position of the target and of the line of fire of the gun is indicated on the target, at the end of the firing interval, by means of the dotter apparatus, which will now be described.

G represents a tampion, which is adapted to slip into the muzzle of the gun, and is prevented from slipping in too far by means of the pin G', see Figs. 1 to 3. To allow for the escape of air from the muzzle of the gun past the tampion, when the latter is inserted, or when the breech is closed with the apparatus in the gun, vent passages g, g', indicated in dotted lines on Fig. 3, may be provided.

Attached to the front end of the tompion, (Figs. 3, 4 and 5) is a plate H. Secured to this plate, by means of the bolts I and nuts I', is the insulating piece K carrying the two coils K' of the electro-magnet. These coils have solenoid cores $K^2$ connected by the armature $K^3$, and this armature is connected by the link L to the frame M, which rocks on the shaft M' in the bracket N. This frame is provided at its upper end with a pin m bearing an anti-friction roller, which roller engages in the elongated slot p in the arm $P^0$, of the frame P. It will be seen that the roller rolls towards the pivot P' thus starting to rock the same at a longer leverage and gradually decreases this leverage, with corresponding increase of speed of the point Q. This affords more power to start the frame P and less to keep it going. This frame rocks on the shaft P', mounted in the bracket N', and carries at one end the counterpoise weights $P^2$, and at the other end the holder $p^2$ for the pencil point Q, which is clamped in said holder by means of the clamp screws p'. Back of the arm $P^0$ is provided a hook p to which is connected the spring R. This spring normally holds the dotter frame in the inoperative position, shown in full lines in Fig. 3, until said dotter frame is moved to the position indicated in dotted lines in said figure under the action of the electro magnet, and against the action of said spring R, as will be hereinafter described.

To provide for the normal firing interval, as well as for abnormal firing intervals caused by hang-fires, or the like, adjustable means are provided for retarding the movement of the marker arm or dotter, so that the pencil point, or other marking point, will not strike the target until a brief interval after the trigger has been pulled. This interval may be varied at will to give the gun's crew better practice, and this interval, like the relative motion of the target to the line of fire may conveniently be exaggerated so as to accustom the gun's crew to compensate for greater errors than those normally encountered in action, and thus may accustom them to fire with great precision when occasion arises, but without necessitating any ordinary target practice, or the expenditure of any ammunition. This object may be secured in various ways but herein I have shown the following construction. The lower end of the frame M is connected to the sleeve S, held between the lock nuts S', on the screw threaded portion t of the piston rod T. see Fig. 3. This piston rod carries the piston T' fitting snugly in the cylinder U, which cylinder is provided with air passages u in front of said piston, and in rear of said piston it is provided with an inlet passage u' connected by the hose or pipe V to the valve seat V' mounted in the sleeve $V^2$. This sleeve is perforated, as at $v^0$ to permit the free escape of the air therefrom, and carries a nut $W^2$ into which the screw threaded stem $W^3$ of the valve W passes. This valve may be moved towards or away from its seat by turning on the milled head $W^5$, which carries a pointer w, which moves over a scale v on the end of the sleeve $V^2$. The position of the valve W is thus indicated by the pointer w of the scale v. To take up any lost motion in the screw threads, and also to allow the valve to open freely on the return stroke of the piston, a weak spring $W^4$ is provided which tends to press the valve towards its seat.

The purpose of the valve arrangement just described is to throttle down the influx of air to the cylinder U and thus to retard the motion of the piston T' in said cylinder, which will cause the point Q to take a longer or shorter time, as may be desired, to move from the initial position to the position for striking the target. Thus by moving the valve W towards or away from its seat, the compensation for the firing interval may be increased or decreased, at will. The spring $W^4$ yields and allows the valve to open freely on the reverse stroke of the piston.

X is an insulating bar carrying the binding posts Y; and Z are the cables for the conductors. These cables may be connected to any suitable push button, or trigger, or other device, for closing the circuit, when desired.

The operation of the device is as follows. Each target D is provided with a number of bull's eyes 1 to 10 etc., as indicated in Fig. 11, and each bull's eye constitutes in effect a separate target, so that the same paper sheet may be used a great number of times without being replaced.

Suppose, for instance, it is desired to aim the gun at the bull's eye marked 9. The men at the two telescopes J and J' bring the cross hairs of their telescopes on the bull's eye 9 of their respective targets at the left and right, respectively, of the cross head C. The target in the meantime is, of course, moving relative to the gun, and the idea is not only to bring the cross hairs on the respective bull's eyes at the proper time, but to keep them on their respective bull's eyes during the interval between the closing of the circuit and the impinging of the point Q on the central target.

If the cross wires of the telescopes have been kept on their respective bull's eyes throughout this interval, the result will be that the point Q will strike its bull's eye, thus making a "hit" if the telescopes have not been properly pointed, or if the cross wires have not been kept on the bull's eye throughout the above mentioned interval, the result will be a "miss"; and by continued practice the gun's crew is enabled to point the gun with extreme rapidity and accuracy. It will be obvious that the results secured with the apparatus will be reproduced when the conditions of actually firing the gun with service charges occur.

The herein described apparatus not only effects a saving in ammunition, doing away with the necessity even of sub-caliber or Morris tube practice; but also renders it possible to carry on the practice in port or alongside the dock, or in company with other ships at sea, without any possible danger from the projectile ordinarily used in sub-caliber practice. Further, the apparatus continues accurate in its action even after it has been in use a great length of time; whereas sub-caliber guns, and rifles used in Morris tube practice soon become leaded or eroded in the bore to such an extent as to become inaccurate in action, giving misleading results and affording valueless training. The apparatus does not require reloading or recharging during its use, thereby saving the labor of an extra man, and precluding the possibility of derangement consequent to said performance. The apparatus contains no complicated lock or other mechanism which demands constant close attention or frequent repair. The retarded action of the apparatus incites the pointers to very accurate pointing, and each error, however minute, is accurately and proportionately recorded.

While I have shown the targets and dotter as mounted in front of the muzzle of the gun, which is the preferable position, they may be mounted at any convenient place forward of the gun mount and in front of the gun sights.

It will also be obvious, to those skilled in the art, that numerous and extensive departures from the form and the details of the apparatus here shown may be made without departing from the spirit of this invention, the same being herein shown solely for the purpose of clearly illustrating one specific embodiment thereof.

Claims.

1. The combination with a target mounted in front of the gun sights, with means for moving said target both laterally and vertically, of a swinging arm carried by the gun and having a marking point, with means for causing said point to strike the target after a predetermined firing interval, substantially as described.

2. The combination with a target mounted in front of the gun sights with means for moving said target both laterally and vertically, of a swinging arm carried by the gun and having a marking point with means for causing said point to strike the target after a predetermined firing interval, and means for varying the firing interval, substantially as described.

3. The combination with a target mounted in front of the gun sights with means for moving said target both laterally and vertically, of a swinging arm carried by the gun and having a marking point, and electro-magnetic means controlled by the gun pointer for swinging said arm and thus causing said point to strike the target after a predetermined firing interval, substantially as described.

4. The combination with a target mounted in front of the gun sights with means for moving said target both laterally and vertically, of a swinging arm carried by the gun and having a marking point, and electro-magnetic means controlled by the gun pointer for swinging said arm and thus causing said point to strike the target after a predetermined firing interval, and means for varying the firing interval, substantially as described.

5. The combination with a target mounted in front of the gun sights with means for moving said target with varying and independent velocities, both laterally and vertically of a swinging arm carried by the gun and having a marking point, and electro-magnetic means controlled by the gun pointer for swinging said arm and thus causing said point to strike the target after a predetermined firing interval, substantially as described.

6. The combination with a target mounted in front of the gun sights with means for moving said target with varying and independent velocities, both laterally and vertically, of a swinging arm carried by the gun and having a marking point, electro-magnetic means controlled by the gun pointer for swinging said arm and thus causing said point to strike the target after a predetermined firing interval, with means for varying the firing interval, substantially as described.

7. The combination with a target mounted in front of the gun, with means for moving said target both laterally and vertically, of a swinging arm carried by the gun and having a marking point, electro-magnetic means controlled and vertically, of a swinging ram carried by the gun and causing said point to strike the target after a predetermined firing interval, and means for varying the firing interval, comprising a pneumatic cylinder and piston, and an adjustable valve for controlling the flow of fluid from said cylinder, substantially as described.

8. The combination with a swinging boom or derrick pivoted to the gun, a target carried by said boom in front of the gun with means for moving said boom both laterally and vertically, of a swinging arm also carried by the gun and having a marking point with means for causing said point to strike the target after a predetermined firing interval, and means for varying the firing interval, substantially as described.

9. The combination with a swinging boom or derrick pivoted to the gun, of a target carried by said boom in front of the gun with means for moving said boom both laterally and vertically, a swinging arm also carried by the gun and having a marking point, and electro-magnetic means controlled by the gun pointer for swinging said arm and thus causing said point to strike the target after a predetermined firing interval, substantially as described.

10. The combination with a target mounted in front of the gun sights, with means for moving said target both laterally and vertically, a swinging arm also carried by the gun and having a marking point, a roller engaging said arm at a varying leverage and electro-magnetic means controlled by the gun pointer for moving said roller and thereby swinging said arm and thus causing said point to strike the target after a predetermined firing interval, substantially as described.

11. The combination with a target mounted in front of the gun sights, with means for moving said target both laterally and vertically, of a swinging arm also carried by the gun and having a marking point, a roller engaging said arm at a varying leverage, electro-magnetic means controlled by the gun pointer for moving said roller and thereby swinging said arm and thus causing said point to strike the target after a predetermined firing interval, and means for varying the firing interval, substantially as described.

12. The combination with a swinging boom or derrick pivoted to the gun, with means for moving said boom with varying and independent velocities, both laterally and vertically, of a target carried by said boom, a swinging arm carried by the gun and having a marking point, and means controlled by the gun pointer for swinging said arm and thus causing said point to strike the target, substantially as described.

13. The combination with a swinging boom or derrick pivoted to the gun, with means for moving said boom with varying and independent velocities, both laterally and vertically, of a target carried by said boom, a swinging arm carried by the gun and having a marking point, electro-magnetic means controlled by the gun pointer for swinging said arm and thus causing said point to strike the target after a predetermined firing interval, and means for varying the firing interval, substantially as described.

14. The combination with a swinging boom or derrick pivoted to the gun, with means for moving said boom with varying and independent velocities, of a target carried by said boom, a swinging arm carried by the gun and having a marking point, electro-magnetic means controlled by the gun pointer for swinging said arm and thus causing said point to strike the target after a predetermined firing interval, and means for varying the firing interval, comprising a pneumatic cylinder and piston, and an adjustable valve for controlling the flow of fluid from said cylinder, substantially as described.

15. The combination with a series of targets mounted in front of the gun sights, with means for moving said series of targets both laterally and vertically, of a swinging arm carried by the gun and having a marking point, and means for causing said point to strike one of said targets after a predetermined firing interval, substantially as described.

16. The combination with a series of targets connected together and mounted in front of the gun sights, with means for moving said series of targets both laterally and vertically, of a swinging arm carried by the gun and having a marking point, with means for causing said point to strike one of said targets after a predetermined firing interval, and means for varying the firing interval, substantially as described.

17. The combination with a series of targets connected together and mounted in front of the gun sights, with means for moving said series of targets both laterally and vertically, of a swinging arm carried by the gun and having a marking point, and electro-magnetic means controlled by the gun pointer for swinging said arm and thus causing said point to strike one of said targets after a predetermined firing interval, substantially as described.

18. The combination with a series of targets connected together and mounted in front of the gun sights, with means for moving said series of targets both laterally and vertically, of a swinging arm carried by the gun and having a marking point, and electro-magnetic means controlled by the gun pointer for swinging said arm and thus causing said point to strike one of said targets after a predetermined firing interval, and means for varying the firing interval, substantially as described.

19. The combination with a series of targets connected together and mounted in front of the gun, with means for moving said series of targets with varying and independent velocities, both laterally and vertically, of a swinging arm carried by the gun and having a marking point and electro-magnetic means controlled by the gun pointer for swinging said arm and thus causing said point to strike one of said targets after a predetermined firing interval, substantially as described.

20. The combination with a series of targets connected together and mounted in front of the gun, with means for moving said series of targets with varying and independent velocities, both laterally and vertically, of a swinging arm carried by the gun and having a marking point, electro-magnetic means controlled by the gun pointer for swinging said arm and thus causing said point to strike one of said targets after a predetermined firing interval, and means for varying the firing interval, substantially as described.

21. The combination with a series of targets connected together and mounted in front of the gun, with means for moving said series of targets both laterally and vertically, of a swinging arm carried by the gun and having a marking point, electro-magnetic means controlled by the gun pointer for swinging said arm and thus causing said point to strike one of said targets after a predetermined firing interval, and means for varying the firing interval, comprising a pneumatic cylinder and piston, and an adjustable valve for controlling the flow of fluid from said cylinder, substantially as described.

22. The combination with a swinging boom or derrick pivoted to the gun, of a crosshead carried by said boom, a series of targets carried by said cross head, with means for moving said boom both laterally and vertically, and a swinging arm also carried by the gun and having a marking point with means for causing said point to strike one of the targets after a predetermined firing interval, substantially as described.

23. The combination with a swinging boom or derrick pivoted to the gun, of a cross head carried by said boom, a series of targets carried by said cross head, with means for moving said boom both laterally and vertically, and a swinging arm also carried by the gun and having a marking point with means for causing said point to strike one of the targets after a predetermined firing interval, with means for varying the firing interval, substantially as described.

24. The combination with a swinging boom or derrick pivoted to the gun, of a cross head carried by said boom, a series of targets carried by said cross head, with means for moving said boom both laterally and vertically, a swinging arm also carried by the gun and having a marking point, and electro-magnetic means controlled by the gun pointer for swinging said arm and thus causing said point to strike the target after a predetermined firing interval, substantially as described.

25. The combination with a swinging boom or derrick, pivoted to the gun, of a cross head carried by said boom, a series of targets carried by said crosshead, with means for moving said boom both laterally and vertically, a swinging arm also carried by the gun and having a marking point, and electro-magnetic means controlled by the gun pointer for swinging said arm and thus causing said point to strike the target after a predetermined firing interval, with means for varying the firing interval, substantially as described.

26. The combination with a series of targets mounted in front of the gun sights, with means for moving said series of targets both laterally and vertically, of a swinging arm also carried by the gun and having a marking point, a roller engaging said arm at a varying leverage, and electro-magnetic means controlled by the gun pointer for moving said roller and thereby swinging said arm and thus causing said point to strike one of the targets after a predetermined firing interval, substantially as described.

27. The combination with a series of targets mounted in front of the gun sights, with means for moving said series of targets both laterally and vertically, of a swinging arm also carried by the gun and having a marking point, a roller engaging said arm at a varying leverage, electro-magnetic means controlled by the gun pointer for moving said roller and thereby swinging said arm and thus causing said point to strike one of the targets after a predetermined firing interval, and means for varying the firing interval, substantially as described.

28. The combination with a swinging boom or derrick pivoted to the gun, with means for moving said boom with varying and independent velocities, both laterally and vertically, of a series of targets carried by said boom, a swinging arm carried by the gun and having a marking point, and means controlled by the gun pointer for swinging said arm and thus causing said point to strike one of the targets, substantially as described.

29. The combination with a swinging boom or derrick pivoted to the gun, with means for moving said boom with varying and independent velocities, both laterally and vertically, of a series of targets carried by said boom, a swinging arm carried by the gun and having a marking point, electro-magnetic means controlled by the gun pointer for swinging said arm and thus causing said point to strike one of the targets after a predetermined firing interval, and means for varying the firing interval, substantially as described.

30. The combination with a swinging boom or derrick pivoted to the gun, with means for moving said boom with varying and independent velocities, of a series of targets carried by said boom, a swinging arm carried by the gun and having a marking point, electro-magnetic means controlled by the gun pointer for swinging said arm and thus causing said point to strike one of the targets after a predetermined firing interval, and means for varying the firing interval, comprising a pneumatic cylinder and piston, and an adjustable valve for controlling the flow of fluid from said cylinder, substantially as described.

31. In an apparatus of the character described, the combination with a plate and brackets secured thereto, of a swinging frame provided with an arm carrying a pointer pivoted in one of said brackets and having a cam engagement with the first frame, means for normally holding both frames in the initial position, and an electro magnet for swinging the second frame, substantially as described.

32. In an apparatus of the character described, the combination with a plate and brackets secured thereto, of a swinging frame provided with an arm carrying a pointer pivoted in one of said brackets, a second frame pivoted in a second bracket and having a cam engagement with the first frame, means for normally holding both frames in the initial position, and an electro-magnet for swinging the second frame, with means for checking the movement of the second frame when acted upon by said electro-magnet, substantially as described.

33. In an apparatus of the character described, the combination with a plate and brackets secured thereto, of a swinging frame provided with an arm carrying a pointer pivoted in one of said brackets, a second frame pivoted in a second bracket and having a cam engagement with the first frame, means for normally holding both frames in the initial position, and an electro magnet for swinging the second frame, with adjustable means for checking the movement of the second frame when acted upon by said electro magnet, substantially as described.

34. In an apparatus of the character described, the combination with a plate and brackets secured thereto, of a swinging frame provided with an arm carrying a pointer pivoted in one of said brackets, a second frame pivoted in a second bracket and having a cam engagement with the first frame, means for normally holding both frames in the initial position, and an electro magnet for swinging the second frame, with adjustable means for checking the movement of the second frame when acted upon by said electro magnet, comprising a pneumatic brake connected to said second frame, substantially as described.

35. In an apparatus of the character described, the combination with a plate and brackets secured thereto, of a swinging frame provided with an arm carrying a pointer pivoted in one of said brackets, a second frame pivoted in a second bracket and having a cam engagement with the first frame, means for normally holding both frames in the initial position, and an electro magnet for swinging the second frame, with adjustable means for checking the movement of the second frame when acted upon by said electro magnet, comprising a pneumatic cylinder, a piston in said cylinder, a piston rod connecting said piston and said second frame, and means for regulating the movement of said piston in said cylinder, substantially as described.

36. In an apparatus of the character described, the combination with a plate and brackets secured thereto, of a swinging frame provided with an arm carrying a pointer pivoted in one of said brackets, a second frame pivoted in a second bracket and having a cam engagement with the first frame, means for normally holding both frames in the initial position, and an electro magnet for swinging the second frame, with adjustable means for checking the movement of the second frame when acted upon by said electro magnet, comprising a pneumatic cylinder, a piston in said cylinder, a piston rod connecting said piston and said second frame, means for regulating the movement of said piston in said cylinder, consisting of an air inlet pipe connected to said cylinder, and a throttle valve regulating the flow of air into said inlet pipe, substantially as described.

37. The combination with a gun, a target, means for causing relative movement between the gun and target, and means for effecting a delayed record of the aim of the gun.

38. The combination with an aiming device of a target or other like object at which aim may be taken, an electro-magnetic device for recording the aim, and means for retarding the action of the recording device.

39. The combination with an aiming device of means for effecting a delayed record of the aim thereof at any given time without the issuance of a projectile.

40. The combination with an aiming device, means for recording the aim thereof without the issuance of a projectile, and adjustable means for delaying the action of said recording means.

41. The combination with a gun, a target, means for causing both lateral and vertical relative movement between the target and the gun, aim recording means, and means for effecting record of the aim by said aim recording means after a predetermined firing interval, substantially as described.

42. The combination with a gun, a plurality of targets mounted in front of the gun sights, a marker, and means for effecting engagement between the marker and one of said targets after a predetermined firing interval, substantially as described.

43. The combination with a gun, a target, means for moving the target vertically, independent means for moving the target laterally, and means for effecting a delayed record of the aim of the gun, substantially as described.

44. The combination with a gun, of a marking device, electro-magnetic means for actuating the marking device to effect record of the aim after a predetermined firing interval, and means for varying the firing interval, substantially as described.

45. The combination with a gun, of a gun sight, a movable target in the line of said gun sight, means for moving the target, and means for effecting a delayed record of the aim of the gun taken through said sight at said movable target, substantially as described.

In testimony whereof, I affix my signature, in presence of two witnesses.

RICHARD D. WHITE.

Witnesses:
E. M. BRANDT,
M. C. BODINE.